G. KOCH & J. A. GATES.
VEHICLE WHEEL.
APPLICATION FILED FEB. 14, 1910.

1,002,705.

Patented Sept. 5, 1911.

Witnesses
C. B. Baenziger.
C. C. Jennings.

Inventor
George Koch
James A. Gates
Parker & Burton
Attorneys

COLUMBIA PLANOGRAPH CO., WASHINGTON, D. C.

UNITED STATES PATENT OFFICE.

GEORGE KOCH AND JAMES A. GATES, OF DETROIT, MICHIGAN.

VEHICLE-WHEEL.

1,002,705.  Specification of Letters Patent.  Patented Sept. 5, 1911.

Application filed February 14, 1910. Serial No. 543,893.

*To all whom it may concern:*

Be it known that we, GEORGE KOCH, citizen of the United States, and JAMES A. GATES, citizen of Great Britain, residing at Detroit, county of Wayne, State of Michigan, have invented a certain new and useful Improvement in Vehicle-Wheels, and declare the following to be a full, clear, and exact description of the same, such as will enable others skilled in the art to which it pertains to make and use the same, reference being had to the accompanying drawings, which form a part of this specification.

This invention relates to vehicle wheels. It has for its object an improved wheel in which there is located within the hub of the wheel, a yielding device made in two parts with an interposed spring that yields longitudinally of the axle and allows the axle to drop with respect to the center of the wheel, and because of the interposed spring returns the axle to its central position, when the force, which caused or brought about the dropping action of the axle is removed. In consequence of the action a wheel, traveling over the ordinary somewhat rough roads through the country, transmits the inequalities of its motion due to the roughness of the road to the interposed spring.

Figure 1:
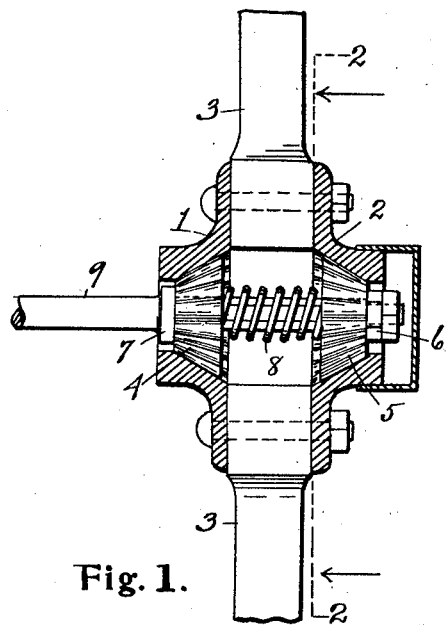
Figure 3:
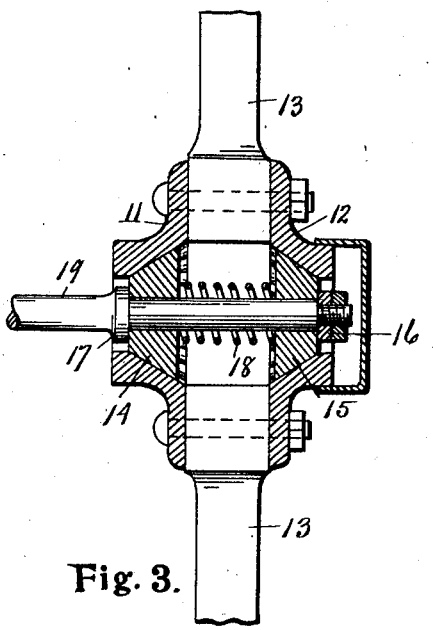
Figure 2:
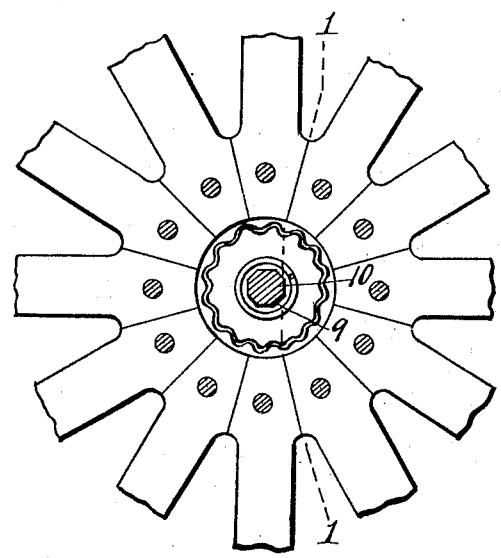
Figure 4:
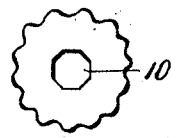
Figure 5:
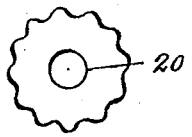

In the drawings:—Figure 1, is a section through the hub longitudinally of the axle member, the member sliding on the axle is shown in elevation. Fig. 2, shows a central part of the wheel with the obverse part of the hub removed. The axle is seen in section. Fig. 3, is a section across a hub, longitudinal of the axle in the modified form in which the wheel rotates upon the axle. Fig. 4, is an elevation of the head located within the hub. Fig. 5, is an elevation of a similar head with a round opening for the passage of a round ended axle through it in the modified form in which the wheel rotates upon the axle.

Figs. 1, 2 and 4 show the character of a wheel and contained parts where the wheel is intended to revolve with the axle, as in the driving wheel of an automobile. Figs. 3 and 5 show a wheel that is intended to revolve on the axle, as in the forward wheels of an automobile.

The wheel is made with hub members 1 and 2, between which the spoke members 3 are secured in any approved way. Each of the hub members 1 and 2 is provided with a cavity that, in its general form, is conical with the larger end of the conical chamber formed in the member turned toward the opposite hub member. On the axle are a pair of conical heads 4 and 5 that are arranged and adapted to slide along the bearing part of the axle toward and away from each other. Their diverging movement is stopped on the one end by the nut 6 and on the other end by the collar 7, and is limited by an interposed spring 8, that surrounds that part of the axle, that extends between the sliding heads 4 and 5, and holds the heads forcibly apart in close engagement with the conical cavities in the hub members 1 and 2. For a wheel, that is intended to rotate with the axle, the outer or conical faces of the head members are corrugated and the inner faces of the hub members, bounding the conical cavities, are correspondingly corrugated so that, as the head members approach to each other, they drop in the chamber in which they are contained, but do not lose entirely their gripping contact with the wheel, and with this character of wheel the head members are perforated with a prismatic opening which is shown in Figs. 2 and 4, so that the head at all times revolves with the axle, although it is capable of a sliding movement along the bearing part thereof. With a wheel like that shown in Fig. 3, in which the wheel is intended to rotate on the axle, the head members 14 and 15 are corrugated frustums of cones, and the hole 20 through each head is round, adapted to rotate on and travel along the axis of the bearing part of the axle. The movement of the heads 14 and 15 is limited by the collar 17 and the nut 16 and by the interposed spring 18. In this case the axle 19 is round and is adapted to turn in the heads.

What we claim is:—

1. In a vehicle wheel, the combination of an axle, a hub member engaging thereon, said hub having two conical cavities with their bases disposed toward each other, corresponding conical head members slidably engaging said cavities and slidable along said axle, means on the face of the cavities and head members to slidably connect the head members and hub so that they will rotate together, a spring yieldingly spacing said head members, stop collars on said axle, limiting the expansion of the head members on said axle, of smaller diameter than the interior of the hub ends and disposed therewithin, whereby the wheel may move laterally of its plane without interference by any of the hub members, substantially as described.

2. In a vehicle wheel, the combination of an axle, opposed conical head members arranged thereon and slidable therealong, a spring yieldingly spacing said members on said axle, stop collars limiting the movement of said head members along said axle, a hub having interior bearing faces slidably engaging the conical faces of said head members, said hub engaging over the stop collars and being normally spaced therefrom, and means for connecting said head members with the hub so that they will rotate together, substantially as described.

3. In a vehicle wheel, the combination of an axle, a hub member engaging thereon and having two conical corrugated cavities arranged with their bases toward each other, conical corrugated head members slidably engaging within said cavities and slidable along said axle, a spring adapted to resist the approach of said head members to each other, and stop collars limiting the separation of said head members on the axle, disposed interior of the hub ends and of less diameter, substantially as described.

In testimony whereof, we sign this specification in the presence of two witnesses.

GEORGE KOCH.
JAMES his X A. GATES.
mark

Witnesses:
CHARLES F. BURTON,
VIRGINIA C. SPRATT.

Copies of this patent may be obtained for five cents each, by addressing the "Commissioner of Patents, Washington, D. C."